Patented Aug. 30, 1932

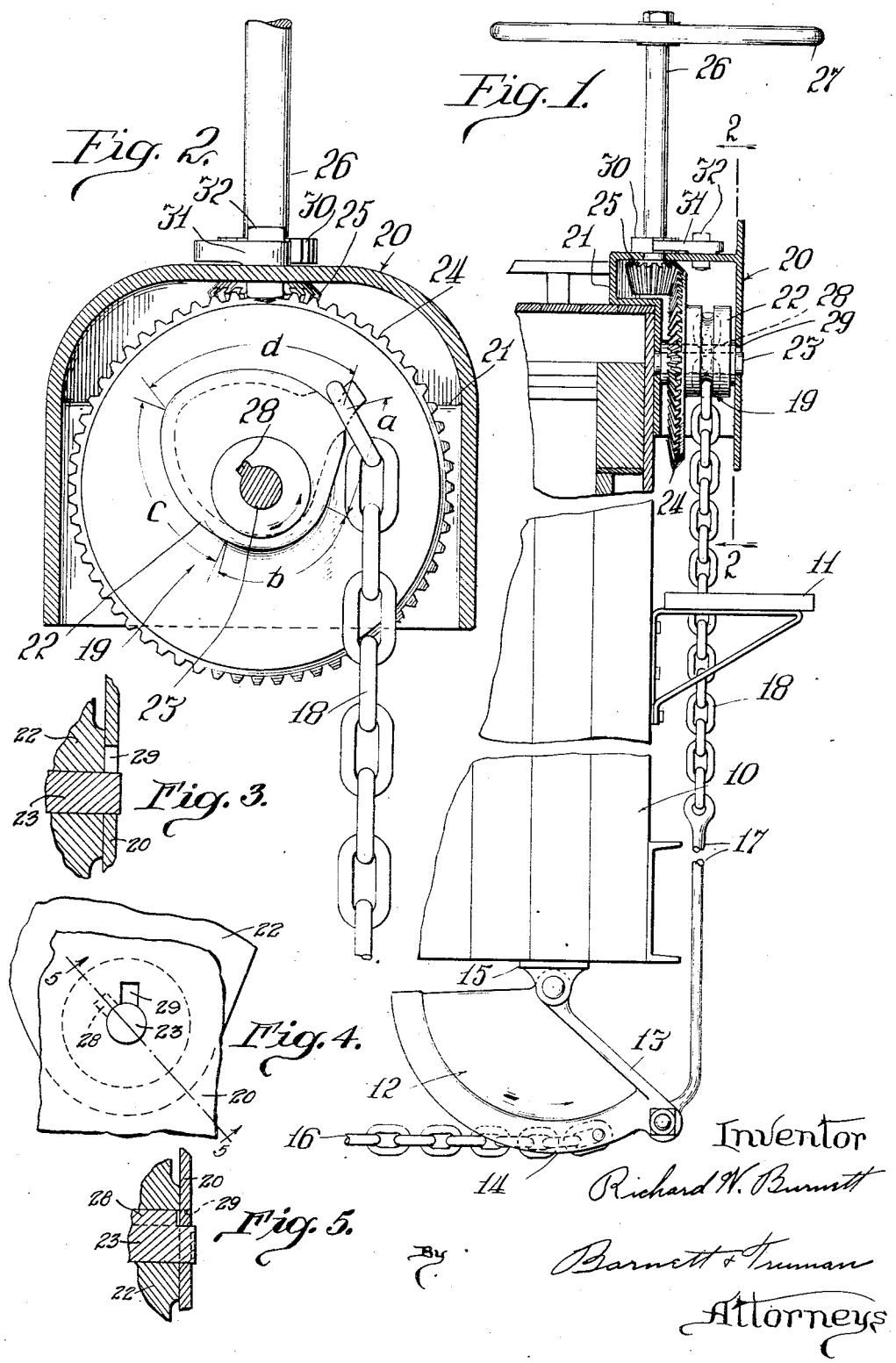

1,874,439

UNITED STATES PATENT OFFICE

RICHARD W. BURNETT, OF CHICAGO, ILLINOIS

HAND BRAKE FOR RAILWAY CARS

Original application filed February 19, 1925. Serial No. 10,248. Divided and this application filed September 13, 1928. Serial No. 305,747.

My invention relates to railway car hand brakes and has for its object the provision of a high powered hand brake which is so constructed and applied to a car that it may be operated to set or to release the brakes while the brakeman is standing on the brake platform or on the top of the car.

Another object is to provide a hand brake of the above character including a vertically disposed brake staff and associated winding mechanism, in which the parts are so constructed as to facilitate convenient assembly and insure efficient operation.

Further novelty will appear in the course of the following description and the features of novelty will be set forth in the appended claims.

A preferred embodiment of the invention is illustrated in the accompanying drawing, wherein:

Fig. 1 is a fragmentary view of a railway box car showing my improved hand brake applied thereto. Fig. 2 is a sectional view on line 2—2 of Fig. 1.

Fig. 3 is a fragmentary sectional view taken through the housing, shaft and winding drum, the said view being taken on a vertical axis.

Fig. 4 is a fragmentary side elevation of the housing and the shaft, showing the relative position of the slot 29 and the lug 28 when the winding drum and shaft are assembled in proper position in the housing, and Fig. 5 is a sectional view similar to Fig. 3, but taken on line 5—5 of Fig. 4.

In the drawing, 10 designates the end portion of a railway box car and 11 a brake platform secured to the end wall of the car. Beneath the car body there is provided a bell crank 12 having a power arm 13 and a winding surface 14. The bell crank is pivotally supported to any suitable portion of the car body, preferably to the under-frame near the end of the car. The member 12 is preferably pivoted in a bracket 15 secured to the car and is normally held in a position whereby a rocking movement in the direction indicated by the arrow in Fig. 1 tends to increase the effective length of the power arm 13 and consequently increases the power applied to the brake chain 16. When the member 12 is rocked in the direction indicated by the arrow in Fig. 1, the chain 16 will be wrapped about the winding surface 14 and carried forward in a manner to apply power to the brakes. The rocking member 12 has pivotally connected thereto a link 17 which, at its upper end, is connected with a flexible connector 18, the latter of which is attached to a winding mechanism, designated generally by the reference character 19. The winding mechanism is preferably enclosed in a housing 20 of any suitable or preferred construction and secured to the end wall of the car preferably near the upper corner thereof. In the present embodiment the housing 20 is formed with an angular portion 21 which projects over and bears against the roof of the car at the end of the car. The winding mechanism comprises a winding drum 22 secured to a horizontal shaft 23 journaled in the housing 20. A relatively large beveled gear 24 is secured to the shaft 23 and meshes with a beveled pinion 25 attached to the lower end of the vertical brake staff 26. The brake staff 26 is journaled in the portion 21 of the housing 20 and is provided at its upper end with a horizontally disposed hand wheel 27. The said wheel is preferably so positioned relative to the roof of the car and relative to the brake platform 11 that it can be conveniently operated while the brakeman is standing on the said brake platform or on the top of the car. The drum 22 is preferably provided with an irregular winding surface. The position of the winding drum shown in Fig. 2 illustrates the position which it assumes when the slack in the brake chain is removed and when the power is about to be applied to the brakes. Preferably the connector 18 is attached to the drum 22 at a substantial distance from the axis and as indicated at 27 in Fig. 2. By an inspection of Fig. 2, it will be seen that the initial winding movement of the drum in the direction indicated by the arrow in Fig. 2, takes place while the power arm of the rocking member 12 is in its lowest position. This operation of the drum effects a quick takeup of the slack in the flexible connectors 16 and 18 and conditions the brake mechanism for the application of pressure to the car wheel. Preferably the brake setting pressure is applied by the winding of the connector 18 upon the portion $b$ of relatively small but uniform radius on the drum. This operation preferably takes place before the upward rocking movement of the power arm 13 has effected any substantial increase in its effective length. During the wrapping of the chain about the section $b$ of the drum, a strong power is applied to the brakes, both by reason of the smaller radius of section $b$ and the increase in the effective length of the power arm of the member 12, such increase in the length of said arm being produced by the further upward movement of the arm. Further rotation of the drum causes the connector 18 to wrap about a portion $c$ of the drum of increasing radius. During the wrapping of the connector about this section of the drum, the power from the drum is slightly decreased, but the decrease in power is compensated by a further increase in the effective length of the power arm of the bell crank. The last quarter $d$ of the winding surface of the drum 22 comes into use when the power arm of the bell crank approaches the horizontal or when it passes beyond the horizontal. This portion of the drum will come into play only when the brake mechanism is applied to cars, the brake cylinder travel of which is abnormally long or when there is an abnormal amount of slack in the brake connections or wearing down of the brake shoes. Normally the brakes will be set very tightly when the connector 18 has been wound about the uniform winding surface $b$ of the drum and in but few cases will the winding extend beyond the surface $c$ of the drum.

In order to facilitate convenient assembly of the winding mechanism, the shaft 23 is provided with a lug 28, along one side thereof, the openings through the drum 22 and the beveled gear 24 for the shaft being so shaped as to receive the lug 28 thereby holding the drum and gear rigid on the shaft. The bearing for the shaft 23 in the wall of the housing 20 is also provided with a notch at one point for the reception of the said lug 28, such notch being indicated by the numeral 29. After the shaft is inserted through the drum and gear, the shaft, drum, and gear are turned to move the lug out of register with the notch 29 as shown in Fig. 4. The position of the notch 29 is such that in the normal operation of the mechanism, the lug 28 will not be brought into registration with the notch, the lug 28 serving to prevent the withdrawal of the shaft 23 from the housing.

The winding mechanism is held in its brake setting position by a ratchet and dog mechanism adapted to be engaged or disengaged by the brakeman, as conditions may require. Preferably the ratchet wheel 30 is secured to the brake staff 26 outside of the housing and is adapted to be engaged by the pivoted dog 31, the latter being pivotally secured to the housing by a bolt 32.

This application is a division of my copending application Serial No. 10,248 filed Feb. 19, 1925.

The combination of the winding mechanism and the bell crank herein shown is not claimed in the present application apart from the special construction of the housing for the winding mechanism, said combination being claimed in my copending applications Serial No. 109,061, filed May 14, 1926, and Serial No. 349,817, filed March 25, 1929.

I claim:

1. An operating mechanism for a railway car hand brake, comprising a housing having bearing openings, one of which has a radially disposed notch therein, a horizontal shaft journaled in said bearing openings, a drum mounted on said shaft within said housing, and a lug on said shaft adapted to be turned into register with the notch in said bearing opening to permit insertion of said shaft therein and which in the normal operative position of the shaft is turned out of register with said notch to prevent withdrawal of the shaft from the housing.

2. A hand brake for a railway car comprising a housing, formed with a vertical portion for attachment to a vertical portion of the car and formed with an angularly disposed portion at the upper end of said housing which projects over the upper edge of the car, a horizontal shaft journaled in the housing below the upper edge of the car, a winding drum secured to said shaft and formed with a winding surface, the center line of which is in a single plane, means connecting said drum with the brake rigging underneath the car, and means for operating the drum comprising a gear on said shaft, a vertical shaft journaled in the angularly disposed portion of said housing, a pinion on the vertical shaft meshing with said gear, and a hand wheel secured to said vertical shaft.

RICHARD W. BURNETT.

CERTIFICATE OF CORRECTION.

Patent No. 1,874,439.  August 30, 1932.

RICHARD W. BURNETT.

It is hereby certified that error appears in the printed specification of the above numbered patent requiring correction as follows: Page 2, line 58, after "of" insert the words the lug relative to; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)